[ US010319272B1

(12) United States Patent
Carter

(10) Patent No.: US 10,319,272 B1
(45) Date of Patent: Jun. 11, 2019

(54) VEHICULAR BRIGHTNESS LIMITING SYSTEM

(71) Applicant: Jason Wade Carter, Athens, AL (US)

(72) Inventor: Jason Wade Carter, Athens, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 15/430,202

(22) Filed: Feb. 10, 2017

Related U.S. Application Data

(60) Provisional application No. 62/293,647, filed on Feb. 10, 2016.

(51) Int. Cl.
*G09G 3/20* (2006.01)
*G06F 3/01* (2006.01)
*B60J 3/04* (2006.01)
*B60J 3/02* (2006.01)

(52) U.S. Cl.
CPC .............. *G09G 3/20* (2013.01); *B60J 3/0291* (2013.01); *B60J 3/04* (2013.01); *G06F 3/013* (2013.01); *G09G 2320/0626* (2013.01); *G09G 2360/144* (2013.01)

(58) Field of Classification Search
CPC .......... G09G 3/20; G09G 3/36; G09G 3/3611; G09G 2320/0626; G09G 2360/144; B60J 3/0291; B60J 3/04; B60R 1/00; B60R 1/001; B60R 2001/1253; B60R 2300/10; G06F 3/013
See application file for complete search history.

(56) References Cited

U.S. PATENT DOCUMENTS 5,920,363 A    7/1999  Rofe
6,618,045 B1 *  9/2003  Lin .......................... G09G 5/10
                                                    345/207

(Continued)

OTHER PUBLICATIONS

"Automotive Glare Reduction System for Enhanced Vision," YES Invent Business Development Facilitators, http://yes-invent.com/Automotive-Glare-Reduction.html.

(Continued)

*Primary Examiner* — Tom V Sheng
(74) *Attorney, Agent, or Firm* — Maynard Cooper & Gale, P.C.; Jon E. Holland

(57) ABSTRACT

A sensor of a brightness limiting system of a vehicle may sense light from light sources around the vehicle and provide a light measurement signal. The light measurement signal may include information about brightness levels and positions of light sources relative to a window of the vehicle. A brightness controller may monitor the light source measurement signal and perform comparisons of brightness levels from the light measurement signal with brightness thresholds. The brightness controller may determine that a brightness level of a light source exceeds a brightness threshold and may provide a brightness control signal to a brightness control layer positioned adjacent to the window of the vehicle. The brightness control layer may receive the brightness control signal and limit the brightness level of light based on the brightness threshold at a brightness control area of the brightness control layer.

27 Claims, 7 Drawing Sheets

(56) References Cited

U.S. PATENT DOCUMENTS

| | | | |
|---|---|---|---|
| 6,666,493 B1* | 12/2003 | Naik | B60J 3/0204 |
| | | | 296/97.4 |
| 6,786,610 B2 | 9/2004 | Faris | |
| 7,413,233 B1 | 8/2008 | Jung | |
| 9,255,813 B2 | 2/2016 | Liu et al. | |
| 9,323,053 B2 | 4/2016 | Lam | |
| 9,329,387 B2 | 5/2016 | Border et al. | |
| 9,712,741 B2 | 7/2017 | Kothari | |
| 2014/0267203 A1* | 9/2014 | Ramanathan | G09G 5/10 |
| | | | 345/207 |
| 2015/0022543 A1* | 1/2015 | Nelson | B60R 1/088 |
| | | | 345/589 |

OTHER PUBLICATIONS

Paul Weissler, "6 New Car Technologies in Your Not-So-Distant Future," Popular Mechanics, http://www.popularmechanics.com/cars/a5466/4219496/, Sep. 30, 2009.

* cited by examiner

VEHICULAR BRIGHTNESS LIMITING SYSTEM

CROSS REFERENCE TO RELATED APPLICATION

This application claims priority to U.S. Provisional Patent Application No. 62/293,647, entitled "Brightness Limiting System (BLS)" and filed on Feb. 10, 2016, which is incorporated herein by reference.

RELATED ART

A user's ability to see an environment clearly is often critical to his or her ability to perform certain tasks. This is especially true when a user performs tasks like operating a vehicle, when low or impaired visibility and can result in a significant reduction in the user's ability to drive in a safe and responsible manner. Even a temporary reduction in a user's visibility while driving may substantially increase risk of injury to the user and others. For example, reduced visibility may impair the user's ability to detect and avoid obstacles or otherwise operate the vehicle safely.

Various occurrences may reduce visual clarity and impair visibility. For example, particles in the air may limit a distance that a user can see clearly, such as when a user encounters dense fog, smoke or haze. Similarly, dense precipitation may substantially impair a user's ability to see even a short distance. A common cause of reduced visibility for a user operating an automobile occurs when intensely bright light is directed toward the user's eyes. The intense brightness can significantly reduce the user's ability to see other objects, such as by producing a glare or by simply drowning out light reflected by other objects in the environment so that the user cannot see them clearly.

Conventional techniques for reducing effects of bright light on visibility of a user include attempting to position devices such as permanently tinted or polarized glass, a sun visor, or electrochromatic materials approximately between the light source and user. However, such techniques may generally reduce overall visibility by darkening a user's field of view, are limited by angle-dependency, obstruct portions of the user's field of view completely, or do not account for positioning of either the light source or user. Thus, a need exists for improved brightness reduction techniques to generally preserve user visibility even in presence of an intensely bright light source that otherwise likely would reduce or impair the user's ability to see the environment clearly.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
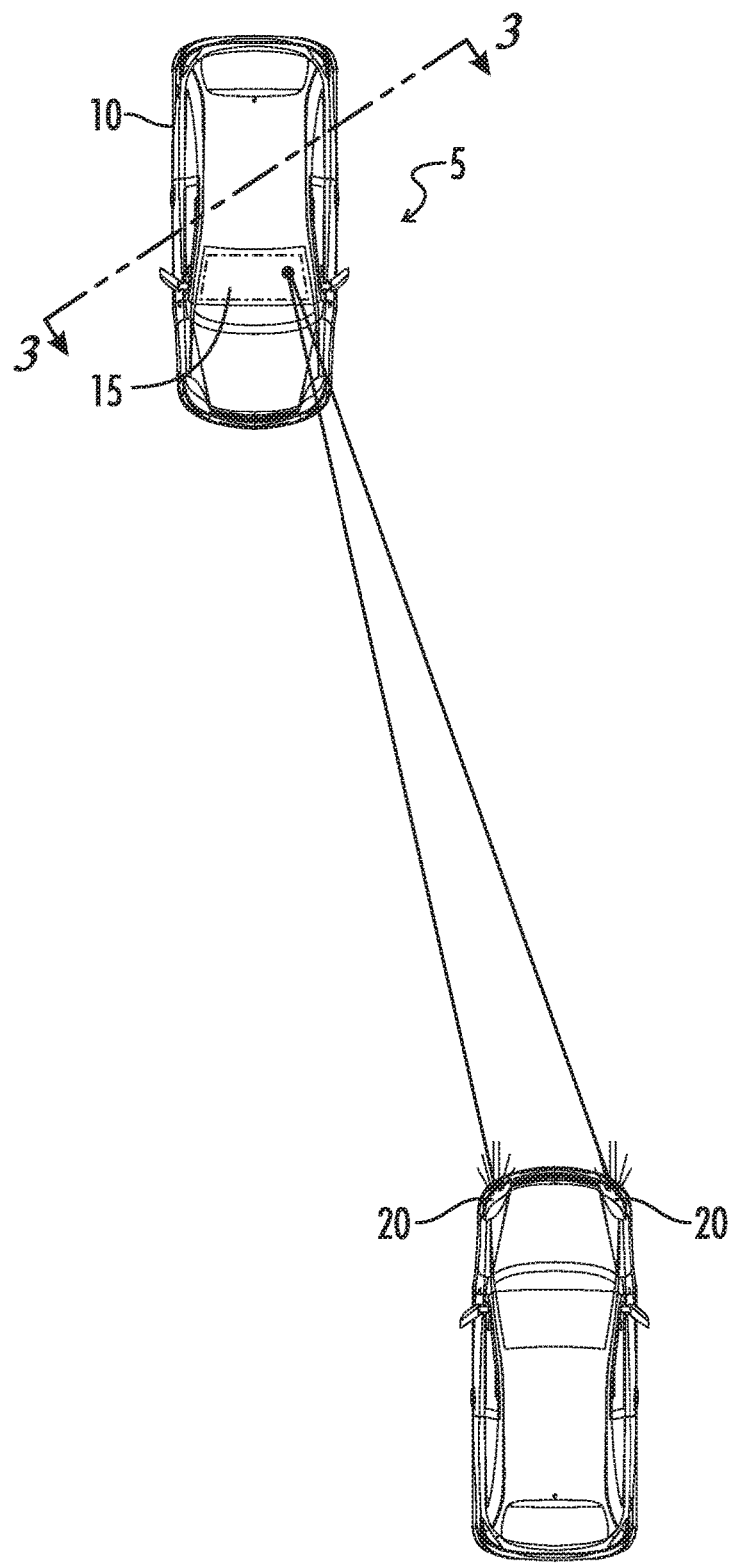
FIG. 1 depicts a top view of a vehicle that has a brightness limiting system in accordance with some embodiments of the present disclosure.

The present disclosure generally pertains to various embodiments of brightness limiting systems for vehicles. A vehicle may have a brightness limiting system for limiting brightness of light passing through a window of the vehicle. For example, a light source, such as the sun or headlights of an oncoming vehicle may be so bright that a driver cannot clearly see. Vehicles often include features such as shades, visors, tinted windows, or electrochromatic devices to alleviate the effects of intense light on a driver's vision. These features may work in some instances, but include drawbacks, such as fixed position, fixed brightness reduction, dimming the driver's entire field of view and partial or complete obstruction of a driver's field of view. Vehicle passengers may experience similar visibility problems.

The brightness limiting system may include a sensor to sense light from light sources around the vehicle and provide a light measurement signal. The light measurement signal may include information about brightness levels and positions of light sources relative to the window. A brightness controller may monitor the light source measurement signal from the sensor for light source brightness levels and light source positions. The brightness controller may perform comparisons of brightness levels from the light measurement signal with brightness thresholds.

The brightness controller may identify a bright area sensed by a sensor and determine that a brightness level of a light source exceeds a brightness threshold based on a comparison between the two. The brightness controller may provide a brightness control signal to a brightness control layer positioned adjacent to the window of the vehicle to limit the brightness level of the light source based on the brightness threshold. The brightness control layer may receive the brightness control signal and limit the brightness level of incoming light based on the brightness threshold at a brightness control area of the brightness control layer. The brightness control area may correspond to a position of the light source such that a substantial amount of light from the light source is blocked or dimmed, thereby reducing a perceived brightness of the light source.

Therefore, when intensely bright light from a light source is incident on a window of the vehicle, the system detects the bright light and adjusts the brightness control area in order to reduce the perceived brightness of the object. To achieve this effect, the system determines through which portion of the brightness control layer the intensely bright light is passing to reach the user's eyes and selects the brightness control area to substantially coincide with this portion. Thus, the dimmed area (i.e., the brightness control area) should be generally between the user's eyes and the light source. In some embodiments, the system may assume that the user's eyes are at a predetermined location when selecting the area to be dimmed. In other embodiments, the system may sense the location of the user or the user's head to make a more accurate determination about where the user's eyes may be located. In yet other embodiments, the system may precisely detect the user's eye location, such as using a facial recognition algorithm to find the user's face and/or eyes within the user's face. By reducing the possible area at which the user's eyes may be located (e.g., more precisely detecting or otherwise determining eye location), the size of the brightness control area may be reduced while still achieving the desired effect to the perceived brightness of the light source.

In some embodiments, the brightness control area may be dimmed to the point where this area appears as a black or otherwise dark spot on or near the window appearing to cover the light source. By reducing the size of the brightness control area, the obstruction to the user's view may be minimized.

FIG. 1 depicts a top view of a vehicle 10 having a brightness limiting system 5 in accordance with some embodiments of the present disclosure. The system 5 may comprise a brightness control layer 15 installed on a window of the vehicle 10, such as the windshield of the vehicle 10. The brightness control layer 15 may be configured to limit a brightness level of light passing through the window of the vehicle 10 from a light source 20, such as by controlling an amount of light that passes through a brightness control area of the brightness control layer, as will be described further below.

In the embodiment of FIG. 1, vehicle 10 is depicted as an automobile, but in some embodiments, vehicle 10 may be various vehicles, such as an aircraft, train, watercraft, recreational vehicle, motorcycle, or otherwise. The vehicle 10 of FIG. 1 is depicted as comprising a single brightness control layer 15, but in some embodiments, a vehicle 10 may comprise various numbers of brightness control layers 15 for limiting brightness levels of light passing through windows of the vehicle 10. In addition, a vehicle 10 may comprise various embodiments of brightness control layer 15 in some embodiments.

As shown by FIG. 1, brightness control layer 15 may have an area and may be positioned adjacent to a window of the vehicle 10 such that light passing through the adjacent window of the vehicle 10 generally also passes through brightness control layer 15. In the embodiment of FIG. 1, brightness control layer 15 is positioned on a front windshield of the vehicle 10, but one or more brightness control layers 15 may be positioned on the rear windshield of vehicle 10, passenger and driver's-side windows of the vehicle 10, or other locations where intensely bright light may impair user visibility. In addition, in some embodiments, brightness control layer 15 may be positioned either on an exterior of vehicle 10, interior of vehicle 10 (e.g., within the passenger cabin), or both.

In the context of this document, a brightness control layer 15 may "limit" a brightness level of a light source by generally decreasing an intensity of light (e.g., reducing transparency by limiting an amount of light transmitted) from a light source passing through the brightness control layer 15, such as intensity or brightness level of light that may be perceived by a user. In some embodiments, a brightness control layer 15 may limit a brightness level of light by various techniques. For example, one or more "pixels" of brightness control layer 15, such as light emitters (e.g., individual diodes of an organic light emitting diode or "OLED" display), points on a grid of an LCD display (e.g., active or passive-matrix), or other subdivisions of a display region or area may be adjusted to limit brightness of light passing through the brightness control layer 15. In some embodiments, one or more pixels may be controlled to reduce transparency of all or a portion of the brightness control layer 15. Note that, in some embodiments, transparency of the brightness control layer 15 may be reduced by controlling a brightness (e.g., illumination) level of a pixel, so that a pixel may appear darkened or substantially black. Other variations to content, color, brightness, or other qualities of a pixel or other components of brightness control layer 15 may be implemented in other embodiments. It will be appreciated by one of ordinary skill in the art that various techniques may be implemented to control or limit a brightness level of light passing through one or more pixels of the brightness control layer based upon this disclosure.

In some embodiments, brightness control layer 15 may comprise various types and combinations of materials and components for achieving the functionality described herein. For example, in some embodiments, brightness control layer 15 may comprise a display, such as a see-through OLED display, LCD display or otherwise. In some embodiments, the layer 15 may be a conventional or commercially available LCD display, such as a Planar® LT3200 Look-Thru® display or other display having suitable transmissivity and brightness control capabilities. In this regard, the layer 15 may comprise a plurality of pixels (e.g., light emitting devices (LEDs), photodiodes, LCD display pixels, etc.).

In embodiments where a pixel comprises a light emitter (e.g., on an LED display), brightness level of light passing through the brightness control layer 15 may be limited by controlling a brightness of a pixel. In this regard, the brightness level of light passing near a pixel may be limited by controlling current provided to the pixel. In some embodiments, pixels may allow some light to pass through (e.g., when pixels are separated by small spaces). In some embodiments, pixels of layer 15 may increase the brightness of the image of the scene that is viewed through the layer 15 (e.g., by emitting white light or other type of light). In some embodiments, a pixel may appear substantially transparent when it is emitting light (e.g., white light) at a sufficiently high brightness (e.g., transparency threshold brightness level). In some embodiments, the brightness of emitters in an area of the layer 15 may be reduced in order to reduce the perceived brightness of (or dim) the scene that is seen through this area. In fact, the brightness of the emitters may be reduced to a sufficient extent such that the area appears black (opaque) or otherwise darker. When the pixel emits light below the transparency threshold brightness level, transparency of the pixel may appear to be reduced (e.g., pixels appear darker) by an amount corresponding to the difference between the brightness of light emitted by the pixel and the transparency threshold brightness level. In some embodiments, the pixel may appear less transparent when it emits light below the transparency threshold brightness, so that the pixel may appear substantially opaque when it is not emitting any light. In this regard, brightness of light passing near a pixel may be limited based on brightness of light emitted by the pixel. Other techniques for limiting transparency of a pixel are possible in other embodiments.

As will be described in more detail hereafter, such a feature may be used to reduce the perceived brightness of one or more external light sources, such as the sun, the headlights of an oncoming vehicle or otherwise. In this regard, one or more corresponding dark areas may be appropriately positioned between the user and each of the respective light sources such that the one or more dark areas appear to cover at least a portion of the one or more light sources. In some embodiments, a dark area may be large enough so that it appears to cover an entire light source. Other techniques for reducing perceived brightness of one or more external light sources are possible in other embodiments.

In embodiments where a pixel comprises a point on a grid of an LCD display (e.g., active or passive-matrix LCD display), a brightness level of light passing through the brightness control layer 15 may be limited by displaying content (e.g., black content or other content) at one or more pixels. By displaying a content, a pixel may block an amount of light passing through the pixel light or otherwise control the pixel's transparency. In some embodiments, the content may cause the pixel to appear substantially opaque, although in other embodiments, the content may permit various amounts of light to pass through (e.g., when content allows some light to pass through). In some embodiments, transparency of a pixel may be adjustable based on content displayed at the pixel. In this regard, content displayed by a pixel may limit or reduce an amount of light passing through the pixel by various amounts.

In some embodiments, transparency of a pixel may be controlled using conventional techniques for displaying content on an LCD display. For example, a pixel may display content based on whether current is provided to contacts of the LCD display corresponding to the location of the pixel. In some embodiments, a pixel may appear substantially transparent when no current is provided to its contacts. The pixel may appear less transparent (e.g., darkened, tinted, or substantially opaque) when its contacts receive current (e.g., the pixel displays black). In some embodiments, a pixel may appear transparent when current is provided to its contacts and less transparent when its contacts receive no current. In yet other embodiments, transparency of a pixel may be controlled based on a brightness level of light from an additional light source (e.g., LED or other lights illuminating an active matrix LCD display). In some embodiments, transparency of a pixel may be controlled by displaying content (e.g., content that appears to darken or otherwise limit brightness of a light source) at the pixel. Other techniques for limiting transparency of a pixel are possible in other embodiments.

As shown in FIG. 1, brightness control layer 15 may be configured to limit brightness for one or more specified areas. For example, light from a light source may be intensely bright at a particular area of the window relative to a user in the vehicle (e.g., driver or passenger), such as at an area along an approximately direct path from the light source to the user's eyes. Brightness control layer 15 may be configured to limit a brightness level of intense light passing through the brightness control layer 15 at such an area, but not limit a brightness level for light passing through other areas of the brightness control layer 15. In this manner, a user's visibility, particularly visibility of a vehicle's driver, will be preserved by limiting the brightness level of the light source (e.g., dimming the brightness level) while allowing other light (e.g., light at a safe level of brightness) to pass through. An area of the layer 15 that is controlled in order to reduce its perceived brightness by reducing the brightness of light emitted by the pixels within such area shall be referred to herein as a "brightness control area."

Light source 20 may be any or a combination of various sources of light having a brightness level, and may produce, reflect, refract, or otherwise propagate light energy directly or indirectly. In some embodiments, light source 20 may comprise any or a combination of various common light sources. In some embodiments, light source 20 may comprise any or a combination of various light sources a user of a vehicle might encounter, such as the sun, one or more lights from another vehicle (e.g., headlights from an oncoming car at night), one or more street lights, illuminated or electronic advertising signs, billboards, or otherwise. Although FIG. 1 depicts headlights from an oncoming car as a light source 20, in some embodiments, a light source 20 may comprise a plurality of light sources 20, and may be various types or combinations of light sources 20. Other light sources 20 may be possible in other embodiments.

FIGS. 2-7 depict various embodiments of a brightness limiting system 5 for limiting a brightness level of a light source 20 perceived by a user 207 in accordance with some embodiments of the present disclosure. Each of the embodiments of brightness limiting system 5 of a vehicle 10 as depicted in FIGS. 2-7 may include a window 212, a sensor 230, and a sensor 232. In addition, in the embodiments of FIGS. 2-7, each of vehicle 10 and light source 20 may be substantially the same as described with reference to FIG. 1 above. Each of the components of system 5 depicted in FIGS. 2-7 may be rearranged, repositioned or reconfigured in some embodiments of the present disclosure to achieve the functionality described herein, and functionality ascribed to a component of system 5 in any of FIGS. 2-7 may be performed by any or a combination of various other components of system 5 in other embodiments.

User 207 is depicted as a driver of vehicle 10, but in some embodiments, user 207 may be any occupant of the vehicle 10. Although one user 207 is depicted in each of FIGS. 2-7, various numbers of users 207 may be possible in some embodiments. System 5 may include components necessary to perform functionality described herein for as many users 207 of vehicle 10 as desired in some embodiments.

Window 212 may be various windows of a vehicle 10 for providing visibility of an environment to a user 207. In the embodiments of FIGS. 2-7, window 212 is depicted as a front windshield of an automobile (vehicle 10). In some embodiments, window 212 may be various windows of an automobile, such as a windshield, driver's or passenger's side windows, or otherwise. In some embodiments, when vehicle 10 comprises an aircraft, window 212 may be a cockpit windscreen. Window 212 may be a window of other types of vehicle 10 in other embodiments.

In yet other embodiments, window 212 may comprise various types of viewports or apertures through which intensely bright light may pass. For example, window 212 may be implemented in a user-wearable device, such as in glasses, a helmet visor, goggles, or otherwise. It will be understood by one of ordinary skill in the art that window 212 may be various types of aperture that may provide visibility of an environment for a user, and in various applications in which system 5 may be implemented to limit brightness of light.

Sensor 230 may comprise various types and combinations of sensors for measuring a light source and providing a light source measurement signal. In some embodiments, sensor 230 may be coupled to vehicle 10 at various location (e.g., a point of the interior of vehicle 10, such as the dash), but sensor 230 may be located elsewhere in other embodiments and positioned as desired for carrying out the functionality described herein. In an embodiment, sensor 230 may comprise one or more optical sensors, but other types of sensors are possible. As an example, sensor 230 may comprise at least one camera for monitoring light levels in an environment (e.g., a field of view of the sensor 230), such as by capturing an image indicative of a field of view of the sensor 230. In some embodiments, sensor 230 may comprise various other types of sensors in combination with the same or different types of sensor, such as a "sensor suite" or otherwise. Other types of information may be measured or captured by sensor 230 in other embodiments.

In some embodiments, sensor 230 may sense (e.g., measure, detect, etc.) light from an environment (e.g., all of a portion of a field of view corresponding to a field of view of a user 207 of vehicle 10) and provide a light source measurement signal based on the sensing. A light source measurement signal may comprise various information, however, in an embodiment, a light source measurement signal comprising one or more brightness levels and positions of one or more light sources. In some embodiments, sensor 230 may capture and provide a light source measurement signal comprising an image. The image may indicate one or more brightness levels and positions of one or more light sources (e.g., light source 20). In some embodiments, the image may comprise a plurality of image pixels. Note that image pixels from sensor 230 or sensor 232 may differ from pixels of brightness control layer 15, and distinctions between such uses of "pixel" herein will be apparent and understood by one of ordinary skill in the art. The image pixels may be associated with coordinates corresponding to locations or positions within a field of view of the sensor 230. For example, each image pixel of an image from a sensor may be correlated with coordinates indicative of a position of various objects (e.g., light source 20) within the field of view of the sensor 230. A controller of system 5 (not shown in FIGS. 2-7) may identify a position of a light source 20 based on coordinates of one or more image pixels of an image from sensor 230 provided as the light source measurement signal. Each image pixel also may comprise a brightness value, and a controller of system 5 (not shown in FIGS. 2-7) may assess a brightness level of light at a location corresponding to each image pixel. In this regard, sensor 230 may provide a light source measurement signal comprising one or more brightness levels.

Sensor 232 may comprise various types and combinations of sensors for sensing a location of a user. In some embodiments, sensor 232 may be coupled to vehicle 10 at various location (e.g., a point of the interior of vehicle 10, such as the roof), but sensor 232 may be located elsewhere in other embodiments and positioned as desired for carrying out the functionality described herein. In an embodiment, sensor 232 may be configured to sense a user generally, such as a proximity sensor that is used to a distance of the user from the sensor 232. In other embodiments, sensor 232 may be configured to sense a particular body part, such as a head or eye of the user.

In some embodiments, sensor 232 may comprise at least one optical sensor, but other types of sensors are possible. In some embodiments, sensor 232 comprises an eye tracker for monitoring positions of a user's eyes in an environment (e.g., a field of view of the sensor 232). In embodiments in which sensor 232 comprises an eye tracker, the sensor 232 may capture returns of infrared light and identify a user's eyes based on the returns. In some embodiments, sensor 232 may be a camera, and may identify a location of a user's eyes by capturing an image indicative of a field of view of the sensor 232. In some embodiments, sensor 232 may comprise various other types of sensors in combination with the same or different types of sensor, such as a "sensor suite" or otherwise. As will be described in more detail herein, by sensing the user's location, the system can more accurately select the brightness control area so that is better positioned between the user's eyes and a light source in order to more effectively reduce the perceived brightness of the external light source.

In some embodiments, sensor 232 may sense (e.g., measure, detect, etc.) one or more users 207 within an environment (e.g., all of a portion of a passenger cabin of vehicle 10) and provide a user location signal based on the sensing. A user location signal may comprise various information, however, in an embodiment, a user location signal comprising one or more user positions and one or more user eye locations. In some embodiments, sensor 232 may comprise an eye tracker 232, and may capture and provide a user location signal comprising a position of one or more eyes of a user based on light sensed by the eye tracker 232. The one or more user positions may be determined based on pre-determined or calibrated information, such as coordinates corresponding to a location of one or more users (e.g., an eye of the one or more users) relative to a brightness limiting layer 15, as depicted in the various embodiments of FIGS. 2-7. In this regard, the user location signal may comprise one or more user positions and one or more user eye locations based on sensing by the eye tracker 232.

In some embodiments, a user location signal may comprise an image, such as when sensor 232 comprises a camera. The image may comprise one or more positions of a user 207 and locations of one or more eyes of a user 207. In some embodiments, the image may comprise a plurality of image pixels. The image pixels may be associated with coordinates corresponding to locations or positions within a field of view of the sensor 232. For example, each image pixel of an image from a sensor may be correlated with coordinates indicative of a position of various objects (e.g., user 207) within the field of view of the sensor 232. A controller of system 5 (not shown in FIGS. 2-7) may identify a position of one or more users 207 based on coordinates of image pixels of an image from sensor 232 provided as the light source measurement signal.

In some embodiments, a controller of system 5 (not shown in FIGS. 2-7) may assess a correlation between one or more facial recognition feature values (e.g., values indicative of a facial feature, such as eyes, nose, mouth, etc.) and one or more corresponding facial recognition feature values from a pre-defined facial recognition template to identify a face of a user 207 (e.g., when the correlation exceeds a predefined threshold). Based on identification of a face of a user in an image from the user location signal, system 5 may determine that a user 207 is present at a location corresponding to image pixels of the image where the face of the user 207 has been identified. Similarly, the user location signal may comprise a location of one or more eyes of the user 207, such as based on the correlation determined by the comparison of the facial recognition feature values with the facial recognition template. The system 5 may determine that one or more eyes of a user 207 are positioned at one or more locations within the field of view of sensor 232 corresponding to image pixels displaying features indicative of eyes (e.g., where a correlation between facial recognition feature values indicative of an eye and corresponding feature values from the facial recognition feature template exceeds a threshold). In this regard, sensor 232 may provide a user location signal indicating one or more user positions and one or more user eye locations.

Figure 2:
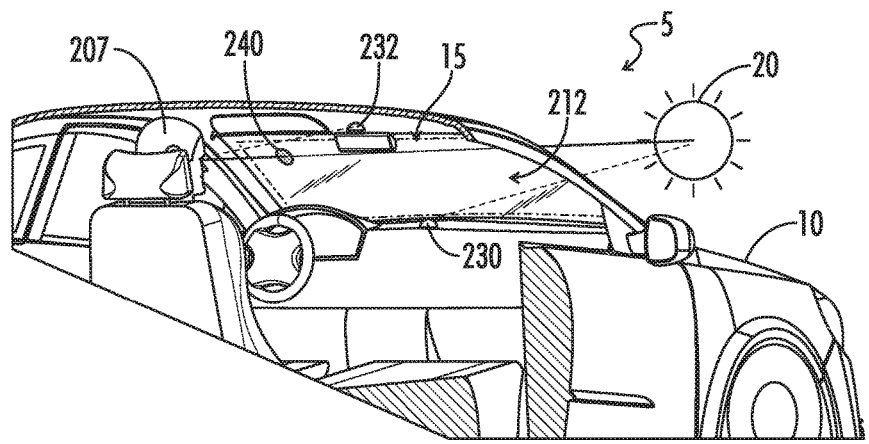
FIG. 2 depicts a three-dimensional perspective view of a vehicle with a brightness limiting system in accordance with some embodiments of the present disclosure.
Figure 3:
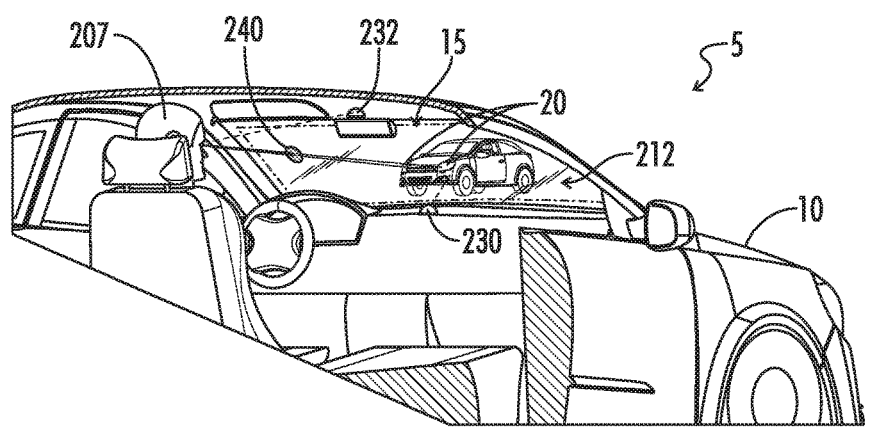
FIG. 3 depicts a three-dimensional perspective view of a vehicle with a brightness limiting system in accordance with some embodiments of the present disclosure.

FIGS. 2 and 3 depict three-dimensional perspective views of exemplary embodiments of a brightness limiting system 5 of a vehicle 10 in accordance with some embodiments of the present disclosure. In the embodiments of each of FIGS. 2 and 3, system 5 comprises a brightness control layer 15, a window 212, sensor 230, and sensor 232. FIGS. 2 and 3 each show a light source 20 which is visible by user 207 (e.g., through window 212). In the embodiment of FIG. 2, light source 20 is the sun. In the embodiment of FIG. 3, light source 20 comprises one or more headlights from an oncoming vehicle. Other light sources 20 may be possible in other embodiments.

In the embodiment of FIGS. 2-3, brightness control layer 15 may have an area corresponding to an area of window 212, and may be positioned adjacent to window 212 (e.g., coupled to the window 212). In some embodiments, brightness control layer 15 may be permanently or detachably coupled to vehicle 10 so that substantially all light that passes through the window 212 passes through brightness control layer 15. As noted above, brightness control layer 15 may be various devices for limiting a brightness level of a light source 20 at a brightness control area 240. In some embodiments, brightness control layer 15 may comprise an OLED display that is essentially transparent when active (e.g., when pixels of the display are powered, substantially transparent, and emit white light or light of another color). Brightness control layer 15 may comprise other devices (e.g., a passive matrix display, indium-tin coated plastic, or other device) and may be normally transparent in other embodiments (e.g., for preserving driver visibility in the event of failure of power or functionality of one or more components of system 5, in particular brightness control layer 15).

In some embodiments, brightness control layer 15 may limit a brightness level based on a brightness threshold at a brightness control area 240. In some embodiments, when system 5 determines that a brightness level of light source 20 exceeds the brightness threshold, the system may provide a brightness control signal to brightness control layer 15. The brightness control signal may include information indicative of a brightness control area 240 on brightness control layer 15. Based on the brightness control signal, brightness control layer 15 may limit a brightness level at the brightness control area 240.

Note that, although brightness control area 240 may be depicted as an approximately circular area, brightness control area 240 may comprise various dimensions, shapes, characteristics, or otherwise for achieving the functionality described herein. For example, in some embodiments, a light from a light source 20 may intersect various areas of brightness control layer 15. Brightness limiting system 5 may determine an area of brightness control layer 15 that will limit the brightness level of light perceived by the user 207, as described further below, and provide a brightness control signal indicative of a brightness control area 240. The brightness control area 240 may correspond to an area of the brightness control layer 15 at which the system 5 has determined light passes through at a brightness level that exceeds a brightness level threshold for the particular environment. In this regard, in some embodiments, the brightness control layer 15 may limit a brightness level of the light at substantially the area where light brighter than a brightness threshold will be perceived by the user 207 (e.g., at the brightness control area 240). In some embodiments, brightness control area 240 may have various dimensions as required to suitably limit a brightness level of light perceived by user 207 based on a brightness threshold.

Figure 4:
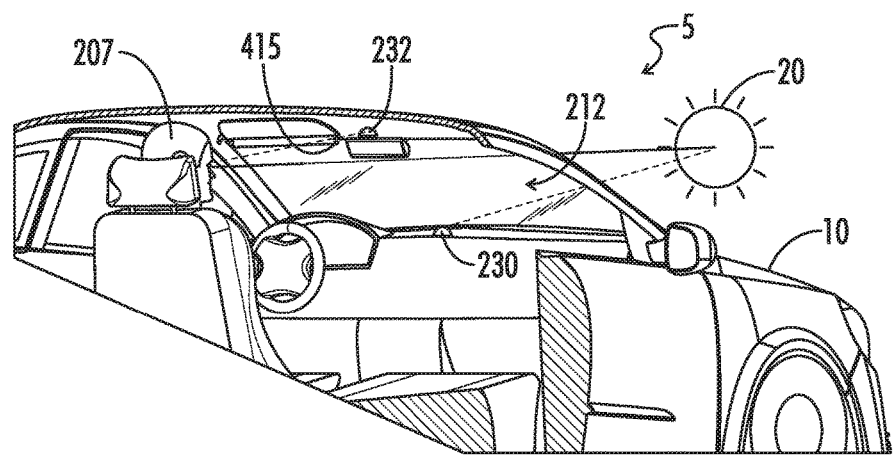
FIG. 4 depicts a three-dimensional perspective view of a vehicle with a brightness limiting system in accordance with some embodiments of the present disclosure.
Figure 5:
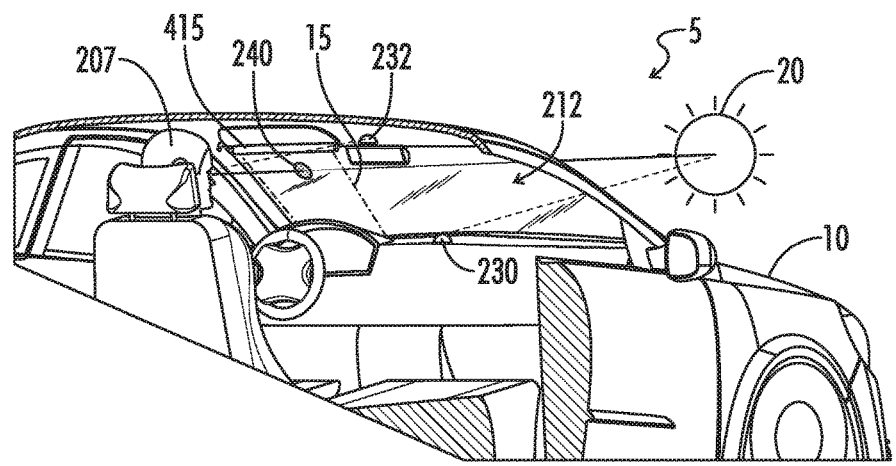
FIG. 5 depicts a three-dimensional perspective view of a vehicle with a brightness limiting system in accordance with some embodiments of the present disclosure.

FIGS. 4 and 5 depict three-dimensional perspective views of exemplary embodiments of a brightness limiting system 5 of a vehicle 10 in accordance with some embodiments of the present disclosure. In the embodiments of FIGS. 4 and 5, system 5 comprises a brightness control layer 15 that covers only a portion of window 212 and is retractable into a housing 415. In some embodiments, the housing 415 may be positioned adjacent to the window 212. Although a single housing 415 is shown in FIG. 4, it will be understood that, in some embodiments, any number of housings 415 may be possible for storing any number of brightness control layers 15 for any number of users 207. In some embodiments, user 207 may prefer to store brightness control layer 15 until it is needed, such as when it is unlikely that the user 207 will encounter a bright light source 20 or at other times. As shown by FIG. 4, user 207 may store control layer 15 (not explicitly shown by FIG. 4) within the housing 415 until desired, such as when one or more brightness levels of light from light sources 20 in the environment do not exceed a brightness threshold.

In some embodiments, the brightness control layer 15 may be retractable so that it may be stored within a housing 415, such as by rolling brightness control layer 15 around a central or longitudinal roller or otherwise. In some embodiments, housing 415 may comprise a spring-loaded roller or a motor coupled to the roller for retracting the brightness control layer 15 into the housing 415. The brightness control layer 15 may be normally stowed until required for limiting brightness of a light source 20.

From time to time, the user 207 may encounter a bright light source 20 (e.g., the sun, etc.). The user 207 may independently determine or may receive a notification (e.g., an alert from system 5 based on a light measurement signal from sensing by sensor 230) that a brightness level of the light source 20 exceeds a brightness threshold. As shown by FIG. 5, user 207 may deploy brightness control layer 15 to limit a brightness level from the light source 20 at a brightness control area 240. In some embodiments, user 207 may deploy the brightness control layer 15 such as by unrolling the brightness control layer 15, such as by pulling down on a latch, tab or handle (not shown) attached to an end of the brightness control layer 15, or by actuating a motor coupled to the brightness control layer 15 and housing 415. The brightness control layer 15 may remain in place after deployment by user 207, such as by coupling of a latch, handle or tab of the layer 15 to an anchoring point or otherwise. When a brightness level from a light source 20 within the user's field of view no longer exceeds a brightness threshold, the user 207 may retract the brightness limiting layer 15. It will be understood that, in some embodiments, brightness control layer 15 may be stored and deployed in various manners (e.g., by shifting, folding, etc.) as desired by a user 207 and may be housed in other housings 415 (e.g., a compartment within a panel of vehicle 10, such as a roof) comprising various components.

Figure 6:
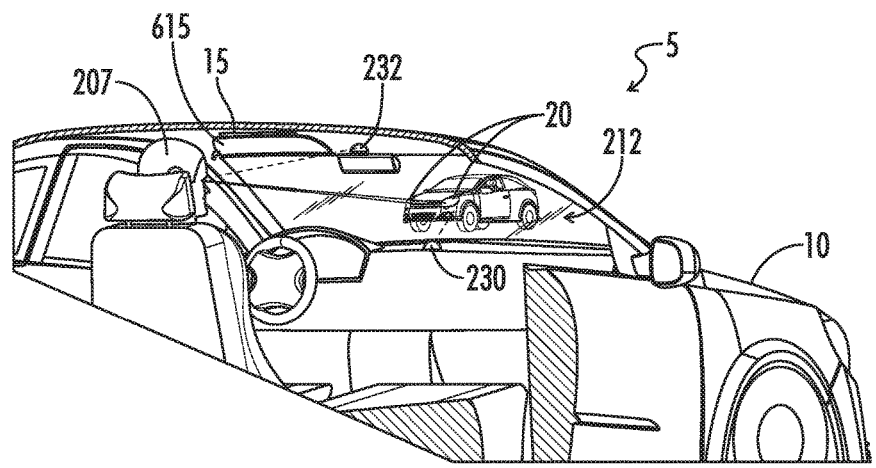
FIG. 6 depicts a three-dimensional perspective view of a vehicle with a brightness limiting system in accordance with some embodiments of the present disclosure.
Figure 7:
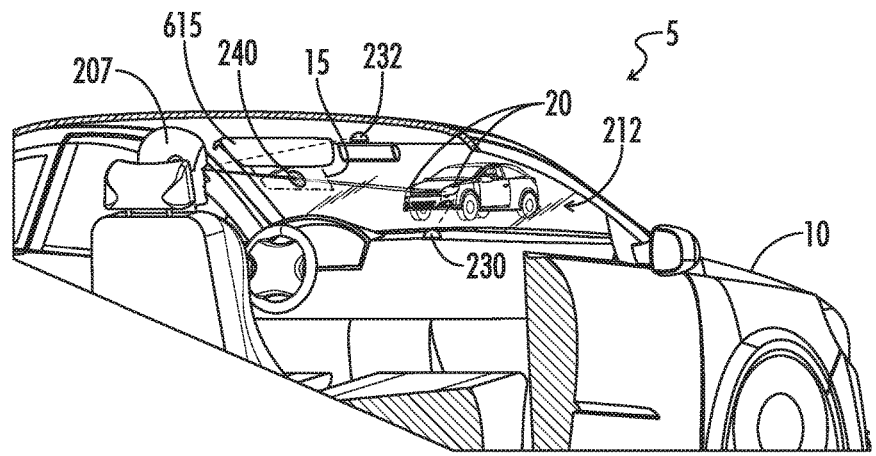
FIG. 7 depicts a three-dimensional perspective view of a vehicle with a brightness limiting system in accordance with some embodiments of the present disclosure.

FIGS. 6 and 7 depict three-dimensional perspective views of exemplary embodiments of a brightness limiting system 5 of a vehicle 10 in accordance with some embodiments of the present disclosure. In the embodiments of FIGS. 6 and 7, system 5 comprises a brightness control layer 15 that covers only a portion of window 212 (e.g., directly in front of a face of the driver 207), and is retractable onto a visor 615. In some embodiments, the visor 615 may be stored adjacent to a roof of the vehicle 10 and pivoted so that it is positioned adjacent to the window 212. Although a single visor 615 is shown in FIG. 6, it will be understood that, in some embodiments, any number of visors 615 may be possible for storing any number of brightness control layers 15 for any number of users 207. In some embodiments, user 207 may prefer to store brightness control layer 15 until it is needed, such as when it is unlikely that the user 207 will encounter a bright light source 20 or at other times. As shown by FIG. 6, user 207 may store control layer 15 (not explicitly shown by FIG. 6) on the visor 615 until desired, such as when one or more brightness levels of light from light sources 20 in the environment do not exceed a brightness threshold.

In some embodiments, the brightness control layer 15 may be retractable or may pivot from the visor 615 so that brightness control layer 15 may be stored on or within the visor 615, such as by flipping, folding, pivoting the brightness control layer 15 up or down (e.g., on a hinge or similar coupling) on the visor 615, or by retracting or deploying brightness control layer 15 to and from an internal slot of visor 615. In some embodiments, visor 615 may comprise various couplings for achieving the functionality described herein. The brightness control layer 15 may be normally stowed at the visor 615 until required for limiting brightness of a light source 20.

In some embodiments, a control layer 15 may be mounted in place of visor 615, so that one or more brightness control layers 15 replaces one or more visors 615 within vehicle 10. In this regard, brightness control layer 15 may itself be swiveled, pivoted or otherwise positioned substantially in front of a user 207 for limiting brightness of one or more light sources 20. In some embodiments, brightness control layer 15 may be configured to be substantially opaque normally, and thus configured to block light in a similar fashion to a traditional car visor (e.g., visor 615) when brightness control layer 15 is "turned off" or otherwise inactive (e.g., is disabled, impaired or not powered). When desired, user may activate or "turn on" the brightness control layer 15, which may perform brightness limiting of one or more light sources 20 as described herein.

As noted above, from time to time, the user 207 may encounter a bright light source 20 (e.g., an oncoming vehicle, etc.). The user 207 may independently determine or may receive a notification (e.g., an alert from system 5 based on a light measurement signal from sensing by sensor 230) that a brightness level of the light source 20 exceeds a brightness threshold. As shown by FIG. 7, user 207 may deploy brightness control layer 15 to limit a brightness level from the light source 20 at a brightness control area 240. In some embodiments, user 207 may deploy the brightness control layer 15 by pivoting the visor 615 and flipping the brightness control layer 15 down, such as by pivoting the layer 15 on a hinge coupled to the visor 615 and brightness control layer 15, by actuating a motor coupled to the brightness control layer 15 and visor 615, or otherwise. The brightness control layer 15 may remain in place after deployment by user 207 until the user 207 desires to retract and store the brightness control layer 15. When a brightness level from a light source 20 within the user's field of view no longer exceeds a brightness threshold, the user 207 may retract the brightness limiting layer 15 and may pivot and store visor 615. It will be understood that, in some embodiments, brightness control layer 15 may be stored and deployed in various manners (e.g., by shifting, folding, etc.) as desired by a user 207 and may be housed in visor 615 using other techniques and may comprise various components.

Figure 8:
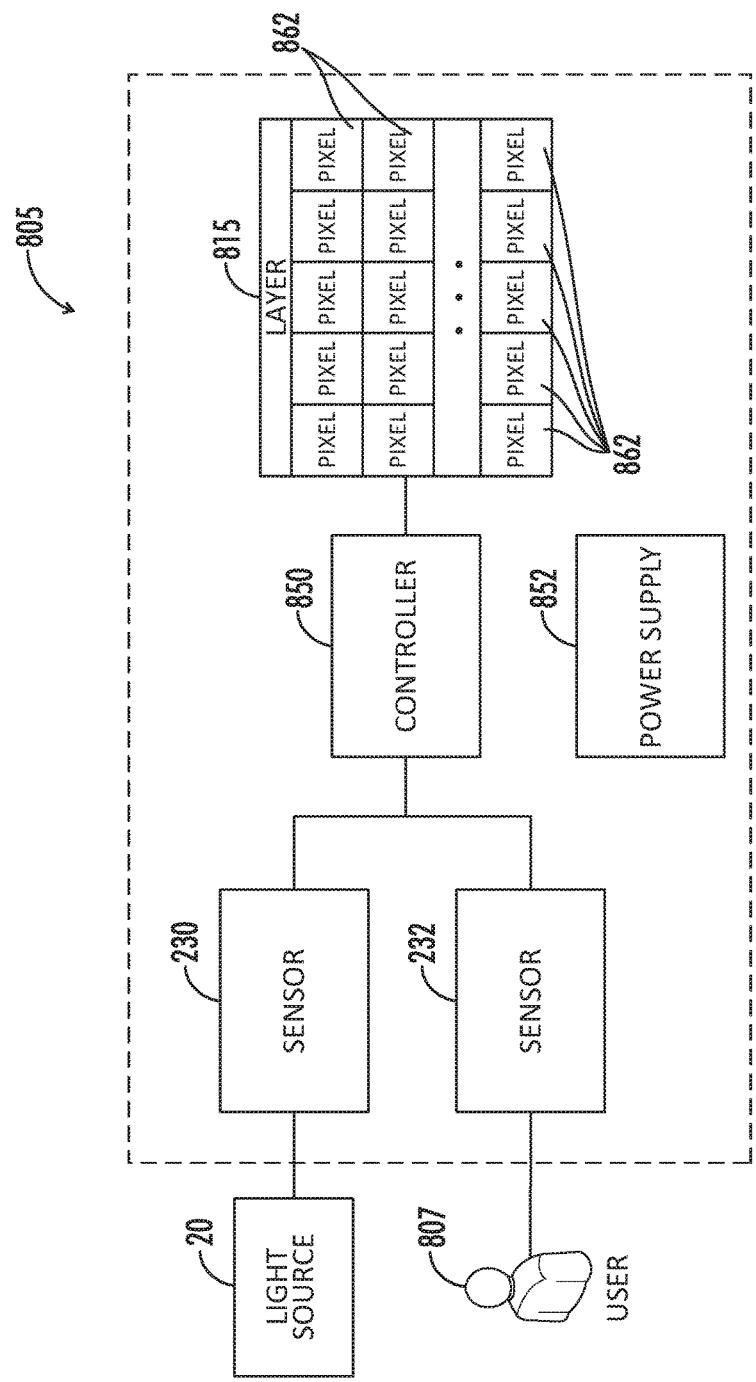
FIG. 8 depicts a block diagram of a brightness limiting system in accordance with some embodiments of the present disclosure.

FIG. 8 depicts a block diagram of a brightness limiting system 805 in accordance with some embodiments of the present disclosure. The brightness limiting system 805 depicted by FIG. 8 comprises a brightness control layer 815, a sensor 230, sensor 232, controller 850, and power supply 852. Other components of brightness limiting system 805 are possible in other embodiments. Brightness limiting system 805 may operate under direction and control of a controller 850, which may be implemented in hardware, software or firmware, or any combination of hardware, software, or firmware. The controller 850 may be configured to control at least the brightness control layer 815 to limit brightness levels of light perceived by a user 207 from a light source 20, as described herein.

The controller 850 may be coupled to a plurality of sensors, including sensor 230 and sensor 232, where each sensor is configured to sense various information and provide signals indicative of the sensed information. In some embodiments, controller 850 may receive a light source measurement signal from the sensor 230 and a user location signal from sensor 232, as described above.

The controller 850 may identify a brightness level of a light source 20 based on the light source measurement signal and compare it with a brightness threshold value. When the controller 850 determines that a brightness level of a light source 20 exceeds a brightness threshold value, the controller 850 may identify a position of the light source based on the light source measurement signal, and, in some embodiments, may identify a user position and user eye location based on the user location signal.

The controller 850 may provide a brightness control signal to the brightness control layer 815 that is indicative of a brightness control area. The brightness control layer 815 may limit a brightness level of light at the brightness control area (e.g., area 240 of FIGS. 2-7) based on the brightness control signal, such as by adjusting characteristics of one or more pixels 862 (e.g., adjust content, brightness, or other qualities of the one or more pixels 862). In some embodiments, the controller 850 may identify a brightness control area based on an area of the brightness control layer 815 through which bright light from the light source 20 passes. The controller 850 may determine where the bright light passes through brightness control layer 815 based on a position of the light source 20 indicated by the light source measurement signal, or based on a user position or user eye location indicated by the user location signal. The controller 850 may provide a brightness control signal to the brightness control layer 815 to limit the perceived brightness level of the light source 20. In this regard, using the brightness control signal, the controller 850 may control the pixels within the brightness control area that is generally between the external light source 20 and the user's eyes so that the brightness of the light passing through such pixels is reduced (e.g., by reducing the pixels' transparency), thereby reducing the perceived brightness of light from the light source 20.

As an example, to limit the brightness level of light passing through the brightness control layer 815, the controller 850 may provide a brightness control signal to the brightness control layer 815. The brightness control signal may be indicative of a brightness control area of the brightness control layer 815, and may control the brightness control layer 815 such that it limits brightness level of light passing through the layer 815 at the brightness control area. In response, the brightness control layer 815 may limit the brightness level of light at the brightness control area, such as by adjusting pixels 862 of the brightness control layer

815. In some embodiments pixels 862 of the control layer 815 corresponding to the brightness control area indicated by the brightness control signal may be adjusted (e.g., to display a black content, to dim, tint, darken, or block light at the area, or otherwise) to limit brightness level of the light passing through the brightness control area. The brightness control layer 815 may limit a brightness level of light at other brightness control areas in a similar fashion.

Note that the pixels 862 of brightness control layer 815 may be adjusted or controlled individually, collectively, or in any desired grouping or pattern based on the brightness control signal from the controller 850. As an example, controller 850 may provide a brightness control signal indicating a brightness control area that corresponds to an area of the brightness control layer 815 comprising a plurality of pixels 862. The brightness control layer 815 may control the plurality of pixels 862, such as by providing or removing current to the pixels in order to limit the brightness level of light passing through the plurality of pixels 862 based on the brightness control signal. The brightness control layer 815 may receive additional brightness control signals and may adjust other pluralities of pixels 862 in a similar fashion, whether consecutively, simultaneously or otherwise.

In some embodiments, system 805 may comprise a user interface (not shown in FIG. 8) for receiving user inputs. The user interface may comprise various components, but in some embodiments, the user interface may comprise a communication link (not shown in FIG. 8) between controller 850 and one or more electronic devices (e.g., electronic devices of the vehicle 10, a mobile device running an application, or otherwise) displaying a graphical user interface (GUI) for receiving user inputs and displaying outputs. In some embodiments, the user interface may be a touch screen (e.g., a navigation screen or other control interface of vehicle 10), but other interfaces are possible. In some embodiments, the communication link may comprise various communication protocols, such as wireless communication protocols like Bluetooth, RF communication, or otherwise. In some embodiments, the communication link may be conductive, such as when the user interface comprises a series of buttons, knobs or other manual controls or inputs for fine-tuning or adjusting characteristics of the brightness control layer and one or more brightness control areas. Other communication links and user interfaces are possible in other embodiments.

In some cases, the brightness control area may be slightly offset from the light source such that it is not precisely positioned between the user's eyes and the light source. As an example, the system may not precisely detect the user's eye location or the user's eyes may otherwise be at a different location relative to the area assumed or detected by the system. Using the user interface, the user may provide inputs for moving the location of the brightness control area so that it is better positioned for reducing the brightness of light from the light source. In some embodiments, the controller 850 saves information indicative of the user adjustments so that the controller 850 can better position the brightness control area in the future for that user. In this regard, when the controller 850 positions a brightness control area in the future for the same user, the controller may use such information to adjust or otherwise control the brightness control area in the manner indicated by the user input previously provided. As an example, one user may be shorter than another so that it would be desirable for the brightness control area to be slightly lower for the shorter user. Based on the inputs provided by such user, the controller 850 may learn that the user prefers a slightly lower brightness control area and automatically position a brightness control area to be lower in the future.

In some embodiments, the controller 850 may estimate the user's eye location based on the foregoing user input, and use this information in the future when positioning a brightness control area. In this regard, when a user provides an input to move a brightness control area, the controller 850 can estimate the user's eye location by assuming that it is at a location along a line that intersects the brightness control area (at its new position) and the light source that has been sensed by the system. When positioning a brightness control area for the same user in the future, the controller 850 may assume that the user's eyes are at the same or similar location or at least the same or similar height. Various other techniques may be used to position a brightness control area based on user input in other embodiments.

In addition, to enable the controller 850 to tailor the operation of the system, such as the placement of a brightness control area, to preferences or a profile of a user, the controller 850 may be configured to identify the user so that preference information (e.g., positioning of a brightness control area) may be associated with the user. In this regard, using the input interface or otherwise, the user may provide inputs indicative of his or her identity. In other examples, the controller 850 may be configured to automatically identify the user. As an example, the controller 850 may employ a facial or voice recognition algorithm to identify the user. In some cases, the controller 850 may leverage other techniques for identifying the user to other components of the vehicle. For example, some vehicle keys are equipped with radio frequency identification (RFID) or other types of components for wirelessly communicating the identity of the user. The controller 850 may have access to such information so that it can identify the user. Yet other techniques for identifying the user are possible in other embodiments.

As an example of an operation of a user interface of system 805 (not shown in FIG. 8), controller 850 may detect a light source and locations of one or more eyes of a user as described above. The controller 850 may provide a brightness control signal to the brightness control layer 815 indicating a brightness control area. In some embodiments, a user 207 may adjust characteristics of the brightness control area using the user interface (not shown in FIG. 8). The user may provide inputs at the user interface (not shown in FIG. 8) to adjust a size, location, transparency or various other characteristics of the brightness control area and brightness control layer 15. The controller 850 may make such adjustments, and may store the adjustments in memory. In some embodiments, the controller 850 may associate the adjustments with various information about the situation, including information about the user 207 (e.g., user profile information or other information described in further detail below), information about light source 20 (e.g., position, brightness level, etc.), or environmental information (e.g., environmental lighting level, time of day, geographic location of the vehicle, etc.). In some embodiments, the controller 850 may use such information to make future decisions when defining a brightness control area, including its location, size, transparency, etc. Controller 850 may use the information described herein and other relevant information for other purposes related to limiting brightness level of a light source 20 in other embodiments.

Figure 9:
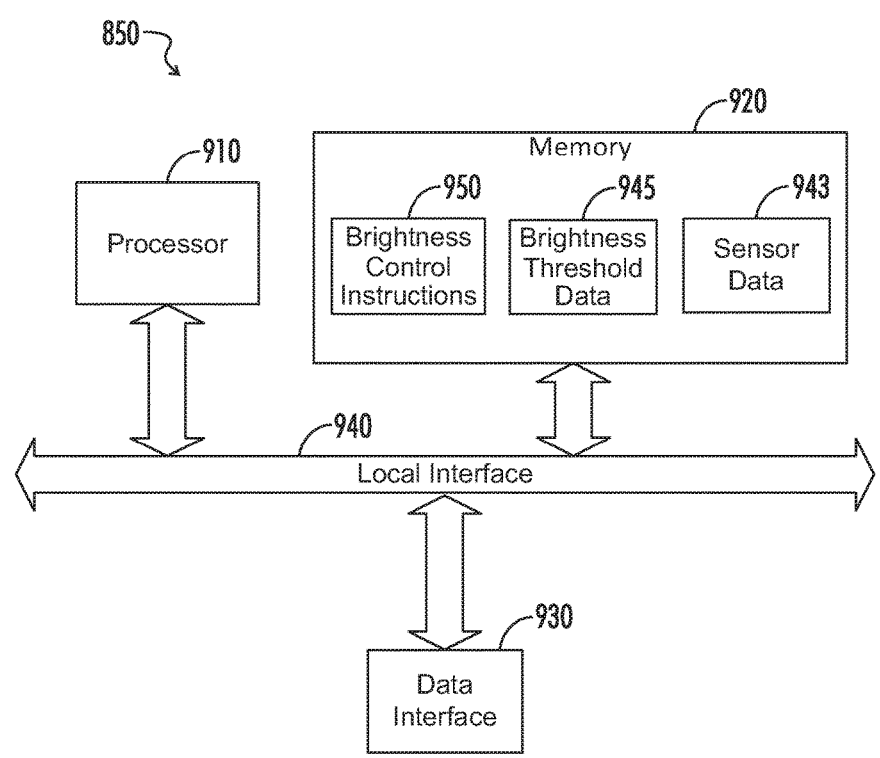
FIG. 9 depicts a block diagram of a controller of a brightness limiting system in accordance with some embodiments of the present disclosure.

FIG. 9 depicts a block diagram of a controller 850 of a brightness limiting system in accordance with some embodiments of the present disclosure. In some embodiments, the controller 850 may include at least one processor 910, memory 920, data interface 930 and local interface 940. In some embodiments, controller 850 may include processing hardware for executing instructions stored in memory 920, such as processor 910. The exemplary embodiment of the controller 850 depicted by FIG. 9 includes at least one conventional processor 910, which comprises processing hardware for executing instructions stored in the memory 920. As an example, the processor 910 may comprise a central processing unit (CPU) or a digital signal processor (DSP). The processor 910 communicates to and drives the other elements within the controller 850 via a local interface 940, which can include at least one bus.

In some embodiments, data interface 930 may comprise hardware or any combination of hardware and software for coupling the controller 850 communicatively with one or more data sources. For example, data interface 930 may be coupled to one or more sensors of vehicle 10 (e.g., sensor 230, sensor 232, etc.) for receiving signals from the sensors (e.g., a light source measurement signal from sensor 230, a user location signal from sensor 232 of FIGS. 2-7, etc.). In addition, data interface 930 may enable controller 850 to communicate with other components of the vehicle 10, such as when providing a brightness control signal to brightness control layer 860 of brightness control system 805 (FIG. 8). In this regard, data processing system 905 may receive and provide communication to various other data sources and components of the vehicle 10.

Sensor data 943 may include information contained in signals received from sensors of the brightness control system 805. In some embodiments, sensor data 943 may comprise information contained in a light source measurement signal received from sensor 230 and user location signal from sensor 232. As described herein, a light source measurement signal from sensor 230 may comprise various information, such as a brightness level of one or more light sources, positions of one or more light sources, and other information. Sensor data 943 may include information associating brightness levels and positions of light sources with pixels from sensor 230, and information associating user eye locations and facial recognition feature values from sensor 232. In addition, a user location signal from sensor 232 may comprise various information, such as a user position, a location of one or more user eyes and other information. In some embodiments, sensor data 943 may comprise information such as information from images from sensor 230, information from eye tracking and images sensed by sensor 232, facial recognition information (e.g., facial recognition feature values, facial recognition templates, etc.), or otherwise. Sensor data 943 may comprise additional information sensed by sensors of brightness limiting system in order to achieve the functionality described herein.

Brightness threshold data 945 may include information related to a threshold brightness level for light sources 20 sensed by sensor 230. Brightness level threshold values may be based on a maximum brightness level of light that may be perceived by a user while still allowing a user to see the user's environment at a level that is within a margin of safety (e.g., for safely operating a vehicle 10 or other task). Brightness threshold data 945 may comprise information indicative of a brightness threshold for a brightness level of one or more light sources 20, either individually, simultaneously or otherwise.

In some embodiments, brightness threshold data 945 may comprise one or more brightness values (e.g., light intensity threshold values, in lumens or other units) for comparison with brightness values from one or more light sources 20 indicated in a light measurement signal from sensor 230. In some embodiments, brightness threshold data 945 may comprise a variety of brightness threshold values, which may be associated with various environmental lighting conditions. For example, a brightness threshold may be lower for brightness levels sensed in low-light environments (e.g., nighttime) than a brightness threshold for brightness levels sensed in a bright environment (e.g., daytime). In this regard, brightness threshold values in brightness threshold data 945 may be associated with an overall brightness level for an environment, and may be based on information such as time of day, (e.g., environmental light levels corresponding to daytime or nighttime), time of year, geographic location, or other information that may be relevant for identifying an appropriate brightness level threshold.

Brightness control instructions 950 may include instructions for controlling any suitable general operations of controller 850, such as performing functionality ascribed to controller 850 and other functionality described herein for limiting a brightness level of light from a light source 20 perceived by a user. In some embodiments, brightness control instructions 950 may comprise an operating system for the controller 850, as well as any drivers, programs, applications or other components of controller 850. Brightness control instructions 950 may be implemented in hardware, software, firmware, or any combination thereof, although in the embodiment of FIG. 9, brightness control instructions 950 are implemented in software and stored in memory 920.

Brightness control instructions 950 may include instructions for receiving and monitoring information from a light source measurement signal from sensor 230 (e.g., stored in sensor data 943), such as for one or more brightness levels and one or more light source positions. Brightness control instructions 950 may include instructions for identifying a brightness level of a light source and the position of the light source based on the light source measurement signal. As an example, in some embodiments, sensor 230 may generate and provide a light measurement signal to the controller 850 (e.g., via data interface 930) that comprises an image indicative of light levels in a field of view of the sensor 230. The image may have image pixels that have brightness values that correspond to brightness levels and coordinate values that correspond to locations within the field of view of the sensor 230. Brightness control instructions 950 may include instructions for receiving the light source measurement signal from the sensor 230 and identify one or more brightness levels based on the brightness values associated with the image pixels where the brightness levels appear. Brightness control instructions 950 also may include instructions for identifying one or more light sources (e.g., based on brightness level values of the image pixels) and determining positions of the one or more light sources based on the coordinate values associated with the image pixels.

Brightness control instructions 950 may include instructions for determining that one or more brightness levels exceed one or more brightness thresholds based on a comparison of the one or more brightness levels with the one or more brightness thresholds. As an example, brightness control instructions 950 may compare a brightness level (e.g., from sensor data 943) with a brightness threshold (e.g., from brightness threshold data 945). In some embodiments, values of the brightness level and brightness threshold may be compared, and the brightness control instructions 950 may include instructions for determining that the brightness level exceeds the brightness threshold.

In response to determining that the brightness level exceeds the brightness threshold, the brightness control instructions 950 may include instructions for providing a brightness control signal to the brightness control layer to limit the brightness level based on the threshold. The controller 850 may generate the brightness control signal using information from sensor data 943 and brightness threshold data 945 to limit the brightness level based on the brightness threshold at a brightness control area of the brightness control layer. For example, brightness control instructions 950 may include instructions for determining an amount by which the brightness level needs to be limited at the brightness control area so that it does not violate the brightness threshold, and the brightness control signal may include information indicative of such amount. In other embodiments, the pixels in the brightness control area may reduce the brightness of emitted light by a predetermined amount. As an example, such pixels may be activated so that they display a content, which may result in the brightness control layer becoming opaque or at least close to opaque (e.g., darkened without being completely opaque).

In some embodiments, the brightness control signal generated by the controller 850 may define a brightness control area. The brightness control area may be identified based on the location of the light source indicated by the light measurement signal (e.g., based on image pixels of an image from sensor 230 having brightness levels above a threshold), but in some embodiments, the controller 850 may identify brightness control area of the brightness control layer 15 based on other information. For example, the controller 850 may identify the brightness control area with regard not only to the light source position (e.g., based on sensor data 943), but also with regard to a user position (e.g., based on sensor data 943), a user eye location (e.g., based on sensor data 943), or otherwise. In this regard, the controller 850 may comprise instructions for monitoring information from a user location signal provided from sensor 232 and storing information indicative of the user position and the user eye location in as sensor data 943.

In some embodiments, the brightness control instructions 950 also may include instructions for identifying the brightness control area based on the light source position and user eye location, such as is stored in sensor data 943. In this regard, the controller 850 may determine the brightness control area by noting the position of the light source associated with the brightness level based on its location indicated by image pixels of an image from sensor 230. The controller 850 next may note the user eye location, such as based on its location indicated by image pixels of an image from sensor 232 or eye tracking data from sensor 232. The controller 850 may then identify the brightness control area by noting an area that is approximately between the light source position and the user eye location, such that limiting the brightness level of light passing through the brightness control area will limit brightness of light perceived by the user. The controller 850 may identify a brightness control area based on other information (e.g., other information from sensor data 943 or otherwise), and using other techniques (e.g., performing other comparisons or determinations) in other embodiments. After the brightness control area with a corresponding brightness level threshold has been identified, the controller 850 may generate the brightness control signal based on the brightness control area and corresponding brightness level threshold and provide the brightness control signal to the brightness control layer 15.

Note that brightness control instructions 950 may further include instructions for defining (e.g., determining a size, shape, location, transparency, etc. of) a brightness control area based on information about a user 207. In some embodiments, the information may include an identity of the user 207, as well as information such as physical characteristics (e.g., height, seated height, eye position relative to head location, etc.), personal characteristics (e.g., gender, age, health conditions, or other factors affecting brightness sensitivity of a user 207), in-vehicle characteristics (e.g., position of one or more eyes of the user 207 when seated in a seat of the vehicle 10, location of the seat where user 207 is seated, etc.), other information about the user 207. In some embodiments, brightness control instructions 950 may define a brightness control area using other information that may be relevant for defining a brightness control area.

The information described above may defined using various techniques and stored in various locations accessible by processor 910 when executing brightness control instructions 950, including memory 920 (e.g., as data not specifically shown in FIG. 9) or other locations. In some embodiments, such information may be defined based on information sensed, received or collected by system 805 (e.g., sensors 230 and 232 or other data input sources). For example, in embodiments in which sensor 232 comprises an eye tracker, a position of a user 207 (e.g., horizontal, vertical position, distance from window 212, or other information), an identity of a user 207 or other information may be determined based on data sensed by sensor 232 (e.g., eye movements) and may be used to retrieve associated user information. In some embodiments, the information may be entered by a user 207, such as when a user 207 sets up (e.g., populates) a user profile associated with the user 207 by using manual inputs. The user 207 may set up a profile by entering information about the user 207, and may utilize various methods for receiving, organizing and storing such data (e.g., a website or application accessible using a computer, mobile device, software interfaces, or otherwise). In some embodiments, a user profile may comprise an identity of the user, vehicle seating presets, etc. A user profile may comprise various types of information, including any suitable information for achieving the functionality described herein.

Note that each time a user 207 uses system 805, the system 805 may collect and store information collected about the use of the vehicle 207. The system 805 may store such information to build a model for tailoring operation of the system 805 based on a particular user 207 (e.g., by applying machine learning or similar algorithms to any of the information or data described herein). The system 805 may continuously learn information about each user 207 and each use of system 805 and may perform functionality described herein based on such learning. User-specific information (e.g., information stored in a user profile) may be updated or revised from time-to-time, such as with user-provided inputs or otherwise.

In some embodiments, brightness control instructions 950 may include instructions for retrieving or accessing the user information in response to various events. For example, system 805 may identify a user 207 by matching characteristics of the user 207 with information from one or more user profiles (e.g., stored in memory 920). The characteristics may be determined based on various information: for example, in some embodiments, characteristics of user 207 may be based on an identity of a user 207 indicated by a smart key, user profile, seat position or vehicle operation preset, or other identifier. The information may be used to tailor or adjust operation of the system 805 based on information specific to the user 207 as described above.

As an example, a light source 20 may be sensed using sensor 230. The system 805 may determine information about a user 207, such as based on sensing of one or more eyes of a user using sensor 232, or based on user input such as selecting a user profile, smart key, user-selected preset or otherwise. Based on brightness control instructions 950, the system 805 may note the user information and may determine characteristics of a brightness control area based on information sensed by sensors 230 and 232 as well as and user-specific information (e.g., height, seat position, eye location, brightness sensitivity, etc.). The system 805 (e.g., controller 850) may generate a brightness control signal indicative of the brightness control area. Other techniques for defining and displaying a brightness control area on brightness control layer 815 are possible in other embodiments.

Figure 10:
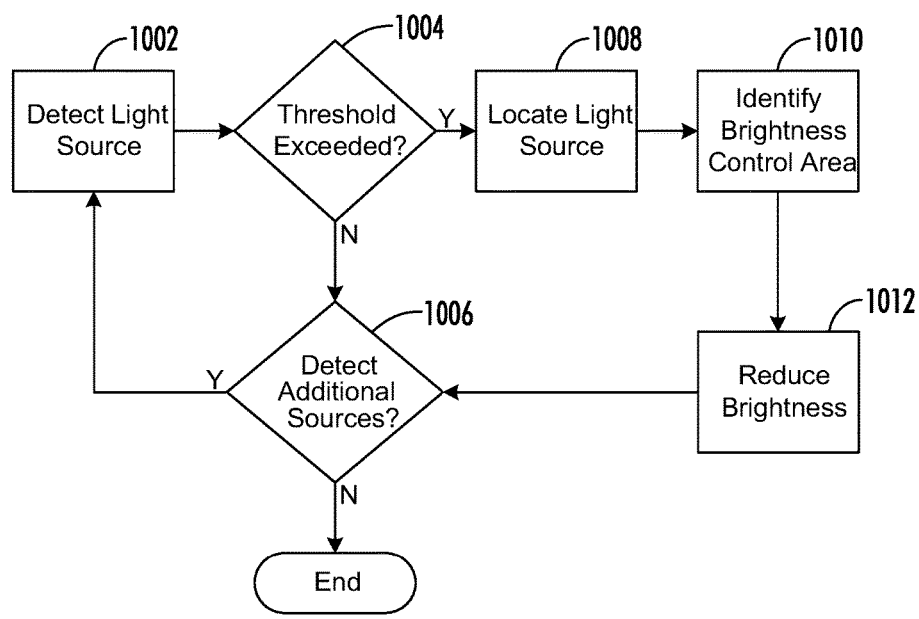
FIG. 10 is a flowchart illustrating an exemplary method for limiting brightness of a light source in accordance with some embodiments of the present disclosure.

FIG. 10 is a flowchart illustrating an exemplary method for limiting brightness of a light source in accordance with some embodiments of the present disclosure. Note that the system 5 (e.g., controller 850) may carry out exemplary steps of FIG. 10 for one or more light sources and over as many iterations as may be desired. In addition, the flowchart of FIG. 10 is non-limiting, and is intended to demonstrate only a portion of the functionality ascribed to any or all of the various components and in the various embodiments of this disclosure.

At step 1002, controller 850 may detect a light source 20 based on information received from a sensor. The controller 850 may detect the light source 20 based on brightness levels of light indicated by the light source measurement signal from sensor 230, such as brightness values associated with image pixels of an image in a light source measurement signal from sensor 230. When the controller 850 determines that a brightness level associated with one or more image pixels is indicative of a light source 20, controller 850 may determine that it has detected the light source 20, and processing may continue to step 1004.

At step 1004 the controller 850 may determine whether a brightness level associated with the light source 20 exceeds a brightness level threshold. The controller 850 may compare a brightness level value from the light source 20, such as may be indicated by brightness values associated with one or more image pixels of the image from sensor 230 in the light measurement signal, with the brightness threshold. If the controller 850 determines that the threshold is not exceeded, processing may continue to step 1006, where controller 850 may determine whether additional light sources 20 should be detected. If the controller determines that the threshold is exceeded, processing may continue step 1008.

At step 1008, the controller 850 may locate a position of the light source 20. The controller 850 may locate the light source 20 based on a location of the light source 20 indicated by image pixels of the image from sensor 230. The controller 850 may note each image pixel associated with a brightness value corresponding to the light source 20 and may determine the position of the light source 20 based on the location (e.g., coordinates) of such image pixels within the image. After the controller 850 has located the position of the light source 20, processing may continue to step 1010.

At step 1010, the controller 850 may identify a brightness control area. In some embodiments, the controller 850 may note the position of the light source 20 and determine an area on brightness control layer 15 that will reduce the perceived brightness of the light source 20 when such area is dimmed. As indicated above, the location of the brightness control area may be based on both the position of the light source 20 and the position of the user, such as the user's approximate eye location. For example, the location of the brightness control area may be selected such that it is substantially between the light source 20 and the user's eye location. Once the controller 850 has identified the brightness control area, processing may continue to step 1012.

At step 1012, brightness of the light source may be reduced at the brightness control area. Controller 850 may provide a brightness control signal that may cause the brightness control layer to limit the brightness level of the light source 20 at the brightness control area. For example, based on the brightness control signal, the brightness control layer may control at least one of the pixels (e.g., junctions of LCD or other displays, diodes or other pixels, as described herein) of the brightness control layer corresponding to the brightness control area so that brightness perceived by a user of the vehicle 10 is limited (e.g., reduced). In some embodiments, the brightness control layer may adjust a transparency of the pixels within the brightness control area to limit the perceived brightness of the light source 20 to the user within the vehicle. After the brightness level has been reduced at the brightness control area, processing may proceed to step 1006. If additional light sources 20 should be detected, processing may return to step 1002. If no additional light sources 20 should be detected, processing may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A system, comprising:
    a first sensor coupled to a vehicle and configured to sense light from a light source external to the vehicle;
    a brightness control layer coupled to the vehicle and positioned such that light incident on a window of the vehicle from the light source passes through the brightness control layer, the brightness control layer having a plurality of pixels; and
    at least one processor configured to determine a position of the light source relative to the vehicle based on the first sensor, the at least one processor configured to identify a brightness control area of the brightness control layer to be dimmed based on the determined position of the light source, the at least one processor further configured to control at least one of the pixels within the brightness control area based on the light sensed by the sensor thereby dimming the brightness control area and reducing a perceived brightness of the light source to an occupant of the vehicle.

2. The system of claim 1, wherein the brightness control layer is coupled to the window.

3. The system of claim 1, wherein the brightness control layer is coupled to a visor of the vehicle.

4. The system of claim 1, wherein the brightness control layer is movable relative to the vehicle.

5. The system of claim 1, wherein the at least one processor is configured to dim the brightness control area in response to a brightness level of the sensed light exceeding a threshold.

6. The system of claim 1, wherein the first sensor is configured to provide an image indicative of sensed light, and wherein the at least one processor is configured to determine the position of the light source based on the image.

7. The system of claim 1, wherein the system further comprises a user interface, and wherein the at least one processor is configured to adjust a location of the brightness control area based on user input received by the user interface.

8. The system of claim 1, wherein the system further comprises a second sensor configured to sense the occupant, wherein the at least one processor is configured to determine a location of the occupant based on the second sensor and to identify the brightness control area based on the determined location of the occupant.

9. The system of claim 8, wherein the system further comprises a user interface, and wherein the at least one processor is configured to adjust a location of the brightness control area based on user input received by the user interface.

10. The system of claim 1, wherein the system further comprises a second sensor configured to sense the occupant, wherein the at least one processor is configured to determine a location of a head of the occupant based on the second sensor and to identify the brightness control area based on the determined location of the head of the occupant.

11. The system of claim 1, wherein the system further comprises a second sensor configured to sense the occupant, wherein the at least one processor is configured to determine a location of one or more eyes of the occupant based on the second sensor and to identify the brightness control area based on the determined location of the one or more eyes of the occupant.

12. A method for reducing a perceived brightness of a light source to an occupant of a vehicle, the method comprising:
  sensing, with a first sensor coupled to the vehicle, light from a light source external to the vehicle, the vehicle coupled to a brightness control layer, wherein the brightness control layer is positioned such that light from the light source incident on a window of the vehicle passes through the brightness control layer, and wherein the brightness control layer has a plurality of pixels;
  determining a position of the light source relative to the vehicle based on the sensed light;
  identifying a brightness control area of the brightness control layer to be dimmed based on the determined position of the light source, the brightness control area corresponding to a location of the brightness control layer between the light source and an occupant of the vehicle; and
  controlling at least one of the pixels within the brightness control area based on the light sensed by the sensor such that the brightness control area is dimmed.

13. The method of claim 12, wherein the brightness control layer is coupled to the window.

14. The method of claim 12, wherein the brightness control layer is coupled to a visor of the vehicle.

15. The method of claim 12, wherein the brightness control layer is movable relative to the vehicle.

16. The method of claim 12, further comprising:
  determining
  whether a brightness level of the sensed light exceeds a threshold, wherein the controlling is based on the determining whether the brightness level of the sensed light exceeds the threshold.

17. The method of claim 12, further comprising providing an image indicative of the sensed light, wherein the determining the position of the light source is based on the image.

18. The method of claim 12, further comprising:
  receiving a user input with a user interface; and
  adjusting a location of the brightness control area based on the user input.

19. The method of claim 12, further comprising:
  sensing the occupant with a second sensor; and
  determining a location of the occupant based on the sensing the occupant,
  wherein the identifying is based on the determined location of the occupant.

20. The method of claim 19, further comprising:
  receiving a user input with a user interface; and
  adjusting a location of the brightness control area based on the user input.

21. The method of claim 12, further comprising:
  sensing the occupant with a second sensor; and
  determining a location of a head of the occupant based on the sensing the occupant,
  wherein the identifying is based on the determined location of the head of the occupant.

22. The method of claim 12, further comprising:
  sensing the occupant with a second sensor; and
  determining a location of one or more eyes of the occupant based on the sensing the occupant,
  wherein the identifying is based on the determined location of the one or more eyes of the occupant.

23. A system for limiting brightness of light passing through a window of a vehicle, the system comprising:
  a first sensor configured to provide a light source measurement signal;
  a brightness control layer adjacent to the window for receiving a brightness control signal to limit a brightness level of light at a brightness control area of the brightness control layer based on a brightness threshold;
  memory for storing light source measurement information, user location information, and brightness threshold information;
  a second sensor configured to provide a user location signal; and
  at least one processor coupled to the first sensor, the second sensor, the brightness control layer and the memory, wherein the at least one processor is programmed to:
    monitor the light source measurement signal from the first sensor for a first brightness level and a first light source position;
    determine that the first brightness level exceeds a first brightness threshold based on a comparison of the first brightness level with the first brightness threshold;
    provide a first brightness control signal to the brightness control layer to limit the first brightness level based on the first brightness threshold at a first brightness control area of the brightness control layer;

monitor the user location signal for a user position and a user eye location; and identify the first brightness control area based on the first light source position and the first user eye location.

24. The system of claim 23, wherein the second sensor comprises an eye tracker.

25. A system for limiting brightness of light passing through a window of a vehicle, the system comprising:

a camera configured to provide a light source measurement signal comprising an image indicating a first light source position;

a brightness control layer adjacent to the window for receiving a brightness control signal to limit a brightness level of light at a brightness control area of the brightness control layer based on a brightness threshold, wherein the first brightness control area corresponds to the first light source position;

memory for storing light source measurement information and brightness threshold information; and at least one processor coupled to the first sensor, the brightness control layer and the memory, wherein the at least one processor is programmed to:

monitor the light source measurement signal from the first sensor for a first brightness level and the first light source position;

determine that the first brightness level exceeds a first brightness threshold based on a comparison of the first brightness level with the first brightness threshold; and provide a first brightness control signal to the brightness control layer to limit the first brightness level based on the first brightness threshold at a first brightness control area of the brightness control layer.

26. The system of claim 25, wherein the first light source position corresponds to one or more image pixels of the image.

27. The system of claim 26, wherein the first brightness control area corresponds to the one or more image pixels of the image.

* * * * *